United States Patent
Walton et al.

(10) Patent No.: US 7,036,594 B2
(45) Date of Patent: May 2, 2006

(54) CONTROLLING A PRESSURE TRANSIENT IN A WELL

(75) Inventors: Ian Walton, Sugar Land, TX (US); Frank F. Chang, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 182 days.

(21) Appl. No.: 10/701,309

(22) Filed: Nov. 4, 2003

(65) Prior Publication Data

US 2004/0089449 A1 May 13, 2004

Related U.S. Application Data

(63) Continuation-in-part of application No. 10/667,011, filed on Sep. 19, 2003, which is a continuation-in-part of application No. 10/316,614, filed on Dec. 11, 2002, now Pat. No. 6,732,798, which is a continuation-in-part of application No. 09/797,209, filed on Mar. 1, 2001, now Pat. No. 6,598,682.

(60) Provisional application No. 60/186,500, filed on Mar. 2, 2000, provisional application No. 60/187,900, filed on Mar. 8, 2000, provisional application No. 60/252,754, filed on Nov. 22, 2000.

(51) Int. Cl.
*E21B 43/25* (2006.01)

(52) U.S. Cl. .......................... 166/297; 166/55

(58) Field of Classification Search ............ 166/250.1, 166/259, 297, 55, 298; 175/4.54
See application file for complete search history.

(56) References Cited

U.S. PATENT DOCUMENTS

| | | | |
|---|---|---|---|
| 3,517,745 A | 6/1970 | Suman, Jr. | |
| 4,175,042 A | 11/1979 | Mondshine | |
| 4,182,418 A | 1/1980 | Jannsen | |
| 4,650,010 A | 3/1987 | George et al. | |
| 5,551,344 A * | 9/1996 | Couet et al. | 102/312 |
| 5,635,636 A | 6/1997 | Alexander | |
| 6,173,783 B1 | 1/2001 | Abbott-Brown et al. | |
| 6,351,991 B1 * | 3/2002 | Sinha | 73/152.01 |
| 6,510,389 B1 * | 1/2003 | Winkler et al. | 702/6 |
| 2002/0020535 A1 | 2/2002 | Johnson et al. | |
| 2002/0177955 A1 * | 11/2002 | Jalali et al. | 702/9 |
| 2003/0089498 A1 | 5/2003 | Johnson et al. | |

(Continued)

FOREIGN PATENT DOCUMENTS

WO    WO 99/42696    8/1999

(Continued)

OTHER PUBLICATIONS

Folse, K., Allin, M., Chow, C., and Hardesty, J., "Perforating System Selection for Optimum Well Inflow Performance," SPE 73762 presented at the Internal symposium on Formation Damage, Lafayette, LA, Feb. 20-21, 2002.

(Continued)

*Primary Examiner*—Kenneth Thompson
(74) *Attorney, Agent, or Firm*—Winstead Sechrest & Minick P.C.; Bryan P. Galloway; Jaime A. Castano

(57) ABSTRACT

A system for controlling a dynamic pressure transient in a well during operations to provide fluid communication between the wellbore and adjacent formation. A method includes determining the characteristics of an adjacent formation, selecting a perforating tool for increasing fluid communication, determining a dynamic pressure transient to enhance the quality of the fluid communication and prevent damage, selecting a wellbore fluid to achieve the desired pressure transient, and performing the fluid communication process based on the selected parameters.

20 Claims, 3 Drawing Sheets

U.S. PATENT DOCUMENTS

2004/0122640 A1* 6/2004 Dusterhoft ............... 703/10
2004/0223853 A1* 11/2004 Khomynets et al. .......... 417/53

FOREIGN PATENT DOCUMENTS

WO      WO 01/25595 A1    4/2001

OTHER PUBLICATIONS

Walton, I.C., Johnson, A.B., Behrmann, L.A., and Atwood, D.C., "Laboratory Experiments Provide New Insights into Underbalanced Perforating", SPE 71642 presented at the Annual Technical Conference, New Orleans, LA, Sep. 30-Oct. 3, 2001.

Johnson, A.B., Walton, I.C., and Atwood, D.C.: "Wellbore Dynamics While Perforating and Formation Interaction," SLB Internal Report PFD01-03.

Chang, F.F., Ali, S.A., Cromb, J., Bowman, M., and Parlar, P., "Development of a New Crosslinked-HEC Fluid Loss Control Pill for Highly-Overbalanced, High-Permeability and/or High Temperature Formations," SPE 39438, presented at the International Symposium on Formation Damage Control, Lafayette, Louisiana, Feb. 18-19, 1998.

Scott, Wu and Bridges, "Air Foam Improves Efficiency of Completion and Workover Operations in Low-Pressure Gas Wells", SPE 27922, Dec., 1995, pp. 219-225.

* cited by examiner

CONTROLLING A PRESSURE TRANSIENT IN A WELL

RELATED APPLICATIONS

This is a continuation-in-part, and claims the benefit of priority, of U.S. Ser. No. 10/667,011 entitled IMPROVING RESERVOIR COMMUNICATION BY CREATING A LOCAL UNDERBALANCE AND USING TREATMENT FLUID, filed on Sep. 19, 2003, which is a continuation-in-part of U.S. Ser. No. 10/316,614, filed Dec. 11, 2002, now U.S. Pat. No. 6,732,798, which is a continuation-in-part of U.S. Ser. No. 09/797,209, filed Mar. 1, 2001, now U.S. Pat. No. 6,598,682, which claims the benefit of U.S. Provisional Application Ser. Nos. 60/186,500, filed Mar. 2, 2000; 60/187,900, filed Mar. 8, 2000; and 60/252,754, filed Nov. 22, 2000. Each of the referenced applications are hereby incorporated by reference.

FIELD OF THE INVENTION

The present invention relates in general to improving fluid communication between a reservoir formation and a wellbore and more specifically to controlling a pressure transient during perforating operations.

BACKGROUND

To complete a well, one or more formation zones adjacent a wellbore are perforated to allow fluid from the formation zones to flow into the well for production to the surface or to allow injection fluids to be applied into the formation zones. A perforating gun string may be lowered into the well and the guns fired to create openings in casing and to extend perforations into the surrounding formation.

The explosive nature of the formation of perforation tunnels shatters sand grains of the formation. A layer of "shock damaged region" having a permeability lower than that of the virgin formation matrix may be formed around each perforation tunnel. The process may also generate a tunnel full of rock debris mixed in with the perforator charge debris. The extent of the damage, and the amount of loose debris in the tunnel, may be dictated by a variety of factors including formation properties, explosive charge properties, pressure conditions, fluid properties, and so forth. The shock damaged region and loose debris in the perforation tunnels may impair the productivity of production wells or the injectivity of injector wells.

One popular method of obtaining clean perforations is underbalanced perforating. The perforation is carried out with a wellbore pressure lower than the formation pressure. After the perforations are created fluid initially flows from the formation through the tunnels removing some of the debris. However, underbalance perforating may not always be effective and may be expensive and unsafe to implement in certain downhole conditions. For example, when reservoir pressure is high and the formation matrix is weak this underbalanced pressure differential may result in collapse of the perforation tunnel and/or excessive sand production.

It is common practice to use a well fluid or mud to create a hydrostatic head in the wellbore. This well fluid can be weighted so as to control to an extent the static pressure differential between the formation pressure and the wellbore pressure. Thus based on the formation characteristics the wellbore fluid may be weighted to create a static underbalance condition wherein the wellbore pressure is less than the formation pressure, a balanced static condition wherein the wellbore pressure and formation pressure are equal, and an overbalance static condition wherein the wellbore pressure is greater than the formation pressure.

Prior art perforation operations often result in damage to the formation which has to be remedied to proceed with production or injection operations. This damage is often caused by utilization of a fluid that allows an excessive dynamic pressure imbalance between the formation and the wellbore proximate the firing of the perforating gun.

When a hydrocarbon bearing reservoir is perforated with shaped charges, several events may occur to cause damage to the formation and impair productivity. Permeability may be reduced due to crushing of the rock around the perforation cavity or by blocking of the perforation tunnel by loose fill or debris, which is created during the penetration of the formation by the shaped charge jet. During an overbalanced state well fluid may enter the tunnels and deposit additional debris. This debris is often difficult to remove from the perforation tunnels with the prior art wellbore fluids. The perforation tunnels created may collapse due to dynamic pressure changes during the perforation process defeating the process or decreasing formation-wellbore communication. Additionally, when the gun is fired with conventional fluids the rapid changes in the wellbore pressure results in "gun jumping." This lead to damage to the downhole tools, perforating gun, and packers.

Additionally, in prior art completions of wellbores the perforation of the wellbore is an isolated step in the completion of a well. After perforating it may be desired to go back into the wellbore and flow a viscous fluid to remove particles from the formation and the wellbore to facilitate production from the well. It may also be desired to go back into the well and inject a fluid that reacts with the desired formation to clean the perforations and increase production.

Therefore, it is a desire to provide a system for controlling the pressure transient during perforation operations that addresses the shortcomings of the prior perforating systems. It is a further desire to provide a perforating fluid that reduces the damage to a reservoir adjacent a wellbore. It is a still further desire to provide a pressure transient control system that utilizes a perforating fluid to control the dynamic pressure transient during the perforation operation. It is a still further desire to provide a pressure transient control system that utilizes manipulation of the perforating gun to control the dynamic pressure transient. It is a still further desire to provide a wellbore fluid that may aid in the removal of fluid communication barriers between the wellbore and adjacent formation.

SUMMARY OF THE INVENTION

In view of the foregoing and other considerations, the present invention relates to enhancing the fluid communication between a wellbore and a formation by controlling the dynamic pressure transient during the perforation operation.

Accordingly, a system for controlling a pressure transient is provided that facilitates enhancing the fluid communication between a wellbore and an adjacent formation. The dynamic pressure control system comprises: perforating a wellbore by detonating a perforating tool, and filling at least a portion of the wellbore with a wellbore fluid selected for controlling the dynamic pressure transient upon and after detonation of the perforating tool.

The present inventive system facilitates controlling the dynamic pressure changes between the wellbore and the formation during perforations operations. Control of the dynamic pressure transient reduces the damage that may be incurred in prior art perforation operations. The inventive system may further include elements in the wellbore fluid to further enhance fluid communication.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
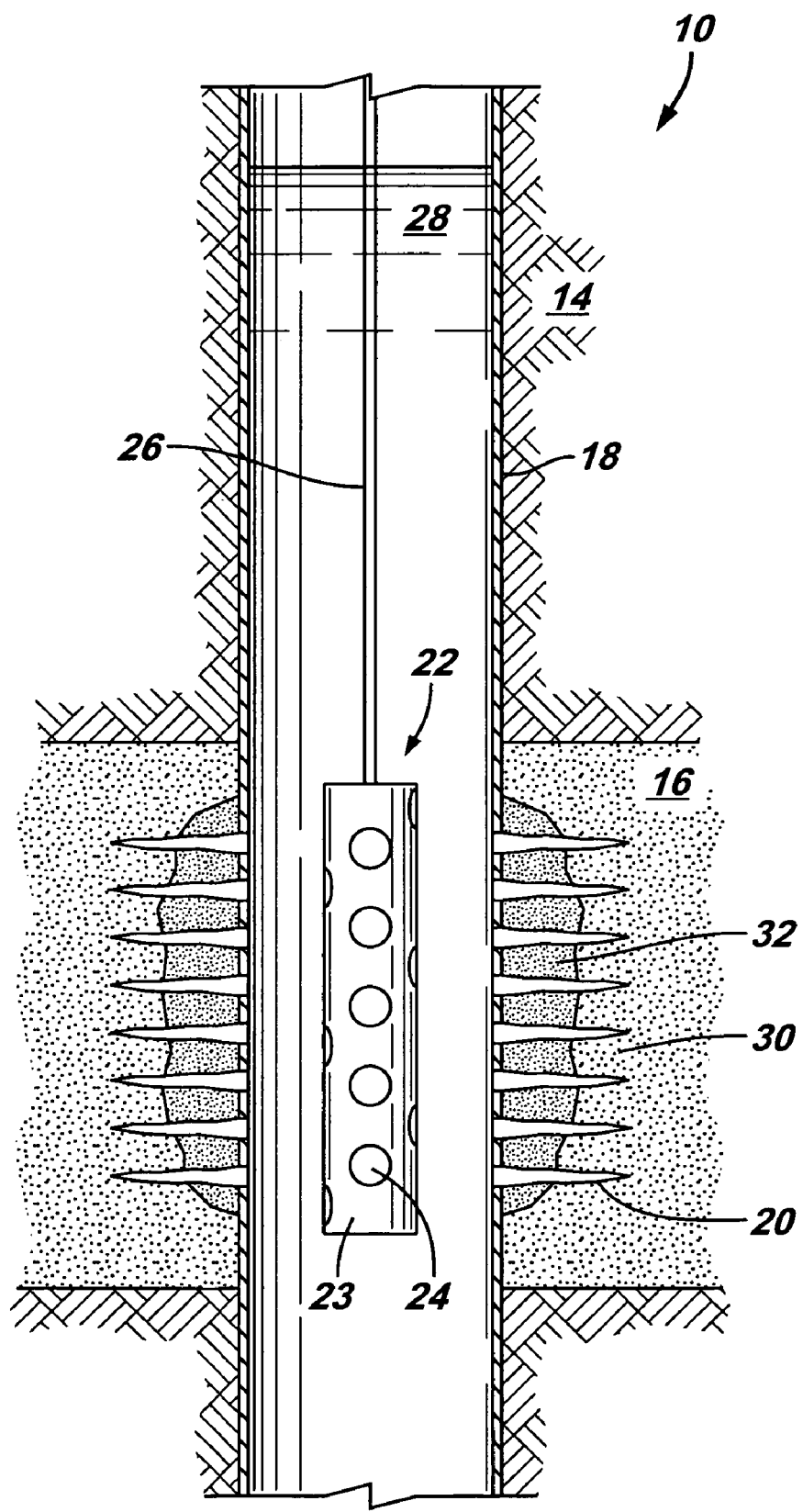
FIG. 1 is a schematic drawing of a perforating system of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIG. 1 is a schematic drawing of a perforating system of the present invention, generally designated by the numeral 10. Perforating system 10 includes a wellbore 12 that is drilled into the earth 14 to a desired formation 16 for producing a fluid from or injecting a fluid therein. Wellbore 12 often includes a casing 18, although wellbore 12 may be open at formation 16. To aid in producing a fluid from or injecting a fluid into formation 16 a fluid tunnel 20 is formed between wellbore 12 and formation 16 to enhance the fluid connection therebetween. Fluid tunnels 20 are created by a perforating gun 22 carrying a penetrating source 24 such as but not limited to a shaped charge. Perforating gun 22 is commonly lowered within wellbore 12 by a wireline 26 or tubing.

Perforating gun 22 includes a housing 23 carrying charges 24. Gun 22 may be designed for specific well applications to achieve a desired tunnel 20 density in formation 16. However, it has been realized that the gun characteristics can be modified to control the pressure transient during the perforating operation. Methods and apparatus for controlling pressure transient and improving reservoir completion are further included by reference herein to related and co-owned patent applications: U.S. Ser. 10/667,011 entitled IMPROVING RESERVOIR COMMUNICATION BY CREATING A LOCAL UNDERBALANCE AND USING TREATMENT FLUID, filed on Sep. 19, 2003; U.S. Ser. No. 10/316,614, published May 15, 2003 as US 2003/0089498 A1, now U.S. Pat. No. 6,732,798; and U.S. Pat. No. 6,598,682.

Wellbore 12 is filled with a perforating fluid 28, which in the prior art perforating systems is typically a completion fluid (e.g. brine). Fluid 28 in wellbore 12 traditionally serves various purposes, such as, but not limited to, preventing the pressurized reservoir fluid 30 from entering wellbore 12 and being released in an uncontrolled manner. In the present invention, fluid 28 is additionally selected and provided to control the dynamic pressure transient of the present invention. Fluid 28 may be a substantially incompressible fluid or compressible fluid, such as, but not limited to, water, brine, foam, liquefied gas such as nitrogen, chelants, surfactant solutions, mutual solvents, visco-elastic surfactants, polymer solutions, crosslinked polymer gel, aphron, or combinations of these fluids. It may be desired to inject a liquefied gas into wellbore 12 proximate formation 16.

In the prior art perforating systems and methods several problems are commonly encountered. One broad problem is that formation 16 is damaged in a manner that reduces the permeability or fluid connection between wellbore 12 and formation 16 thereby counteracting the purpose of perforating formation 16. These problems include excessive sand production from formation 16, collapsing of fluid tunnel 20, clogging of fluid tunnel 20, and damage to formation 16 by invasion of wellbore fluid 28 resulting in debris being deposited in tunnels 20. A second problem is damage to wellbore 12 and the associated equipment during the perforating process. This damage is most severe when "gun-jumping" unseats or damages packers (not shown) requiring additional trips into the hole to correct the damage.

In the prior art perforating systems and methods, the desired pressure differential between the wellbore and the formation were determined as static. Therefore, the pressure differential was addressed before charges 24 are detonated. These prior art systems did not account for the dynamic pressure transient upon firing of charges 24 and thereafter.

During the perforating process, charges 24 are detonated sending an energy source from perforating gun 22 into formation 16 to form fluid tunnels 20. A common and effective way of creating fluid tunnels 20 is to utilize shaped charges 24 that when detonated will penetrate through casing 18 and into formation 16. The firing of shaped charges 24 emits an explosive mass and opens the volume of housing 23 of gun 22 and the volume of charges 24. This event alters the pressure in wellbore 12 from the initial wellbore 12 pressure. The pressure may be higher or lower than the initial wellbore pressure depending on the ratio of the empty gun 22 volume relative to the explosive mass and the compressibility of wellbore fluid 28. Wellbore fluid 28, conventionally a liquid of low compressibility, must then expand or be compressed as gun 22 is filled with wellbore fluid 28 ("gun-filling") or the detonation gas exits the gun and enters wellbore 12, causing dramatic pressure changes in wellbore 12. This dynamic change of wellbore 12 pressure is not addressed by prior art perforating methods and systems. The present invention addresses manipulation of the dynamic pressure changes to improve perforated wellbore productivity.

Figure 2:
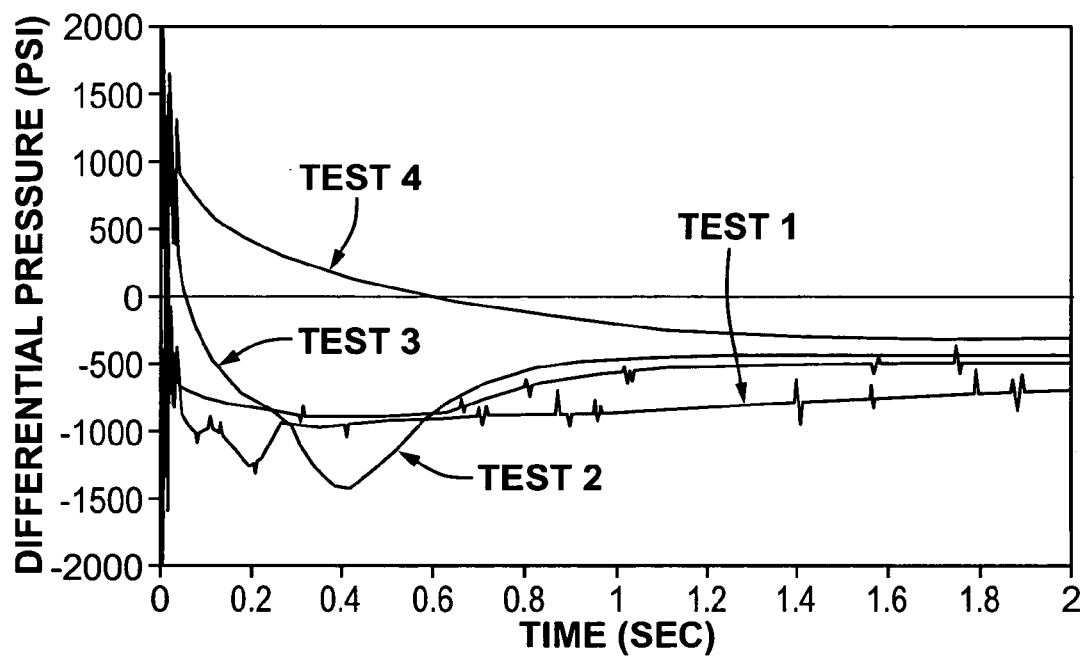
FIG. 2 is a graphical representations of pressure transients in tested perforation operations.
Figure 3:
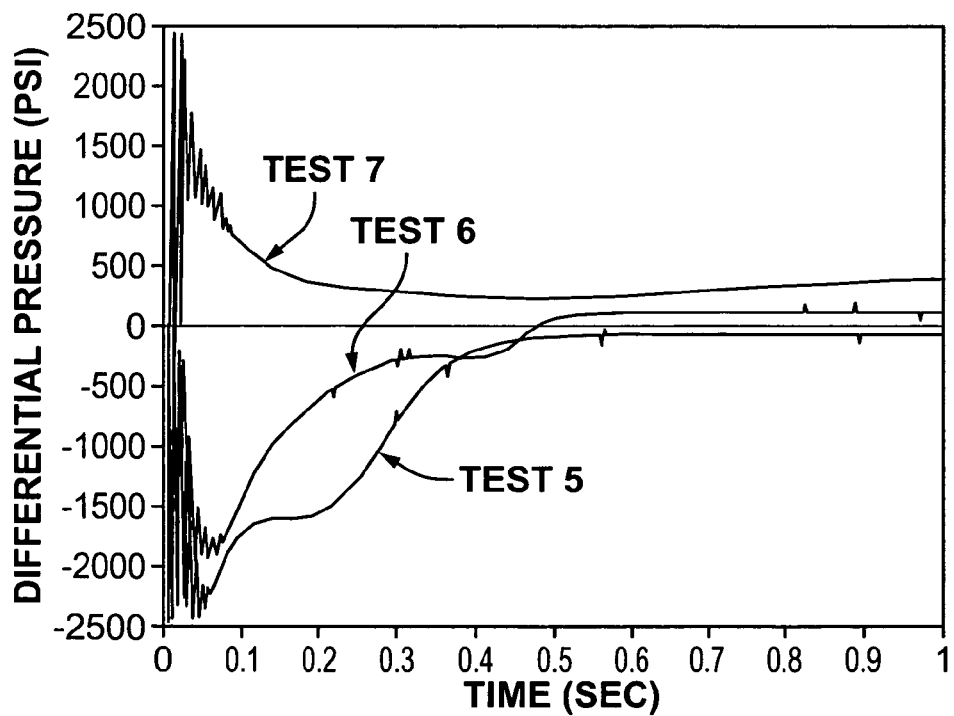
FIG. 3 is a graphical representations of pressure transients in tested perforation operations.

FIGS. 2 and 3 are graphical representations of pressure transients in a perforation operation. In the graphical representation, each test is referenced by time starting with the wellbore pressure and formation pressure in the static condition. FIG. 2 shows the results of four experiments (denoted as Tests 1 through 4) with the same charge 24 that started with an initial underbalance of 1000 psi. The maximum dynamic underbalance varied from 200 psi to 1300 psi. FIG. 2 shows the results of three similar experiments (Tests 5 through 7) that started with a static overbalance of 500 psi. The dynamic underbalance ranged from 2400 psi to negative 300 psi.

In tests 1–4 and 7 the detonation pressure in gun 22 immediately after detonation was higher than the wellbore pressure, described as "gun overbalance." In gun overbalance the detonation gas enters wellbore 12 increasing the wellbore pressure. In tests 5 and 6 the detonation pressure was lower than the static wellbore pressure, described as "gun underbalance." In this case incompressible wellbore fluid 28 enters gun 22 resulting in a sharp reduction in the wellbore pressure.

In many situations it has been desired to achieve a pressure transient profile such as that shown as Test 5. However, the transient profile should be determined based on the matrix of formation 16 to reduce damage and increase fluid communication between wellbore 12 and formation 16.

It is often desirable to create a high dynamic underbalance to promote flow of fluid from formation 16 to wellbore 12 to clean debris from tunnels 20 (Test 5). However, this is not always desired. For example, when perforating in a high pressure formation 16, with weak mechanical strength, high dynamic "underbalance" may result in the collapse of tunnels 20. The present inventive system provides that a compressible wellbore fluid 28 will dampen the rise and fall of pressure from the charge 24 detonation and gun-filling thus reducing the dynamic underbalance. Additionally, wellbore fluid 28 may be highly viscous and elastic thereby limiting the rate of wellbore fluid 28 flowing into gun 22 limiting the dynamic underbalance. Both inventive fluids alleviate perforation tunnel 20 collapse.

When perforating in a stronger mechanical formation 16, the fine-grained particles in the crushed zone 32 may reduce permeability of formation 16 and limit productivity and/or injectivity of formation 16. In this situation it may be desired to have a high dynamic underbalance to remove the debris from tunnels 20 as fluid, both wellbore fluid 28 and formation fluid 30, flow from formation 16 into wellbore 12. It may further be desired to include reactive agents that change the physical or chemical properties of the base fluid, such as, but not limited to, surfactants, viscosifers, solvents, chelating agents, and acid to wellbore fluid 28 to aid in cleaning perforation tunnels 20.

Figure 4:
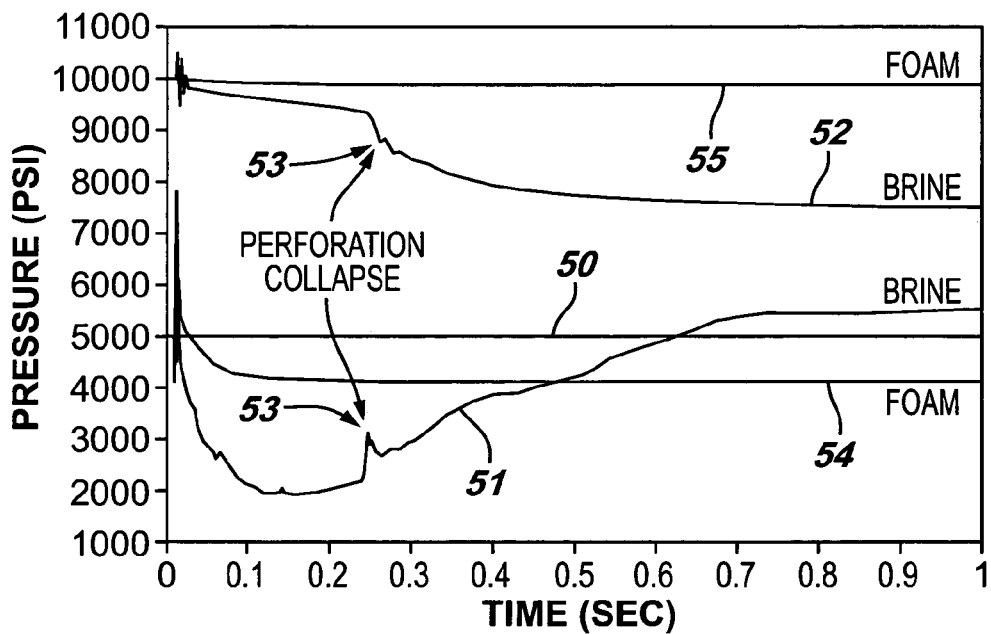
FIG. 4 is a graphical representation of a pressure transient perforation test on a weak Castlegate sandstone utilizing a compressible fluid and an incompressible fluid.

FIG. 4 is a graphical representation of a pressure transient during a perforation test on a weak Castlegate sandstone with a unconfined compressibility strength of approximately 1500 psi. The pore pressure of the formation 16 was at 5000 psi, and the overburden pressure was at 10,000 psi prior to perforating. The test was conducted on two core samples. The first core sample was tested with an incompressible brine fluid 28. The second sample was tested with a compressible foam wellbore fluid 28. Line 50 denotes the reservoir formation 16 pressure.

The first formation sample was tested utilizing a substantially noncompressible brine wellbore fluid 28. The initial static pressure differential was balanced. Line 51 indicates the pore pressure or well pressure at the face of the wellbore 12 and formation 16 interface utilizing the incompressible brine well fluid 28. Line 52 tracks the overburden pressure on formation 16 during the perforation operation. Due to the excessive dynamic underbalance at point 53 the perforation tunnel collapses.

The second formation 16 sample was tested utilizing a substantially compressible foam wellbore fluid 28. The initial static pressure differential between formation 16 and wellbore 12 was underbalanced at 500 psi. Line 54 indicates the pore pressure or well pressure at the face of wellbore 12 and formation 16 interface utilizing the compressible foam well fluid 28. Line 55 tracks the overburden pressure on formation 16 during the perforation operation. By utilizing a substantially compressible wellbore fluid 28 the perforation tunnel did not collapse.

Figure 5:
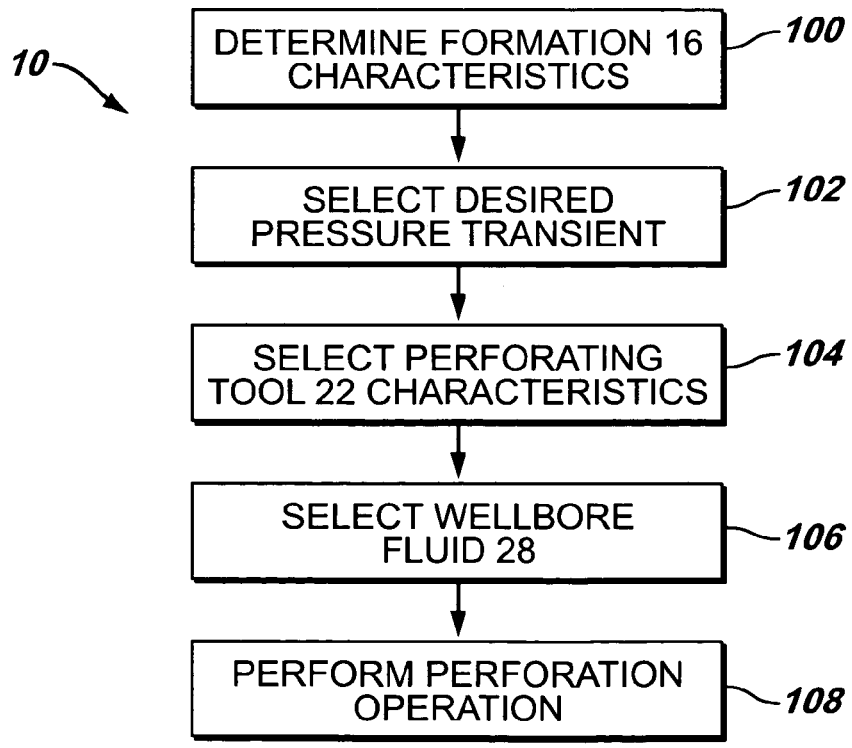
FIG. 5 is a block diagram of a method of controlling a pressure transient during perforation operations of the present invention.

FIG. 5 is a block diagram of a method controlling the pressure transient in a well during a perforating operation. With reference to FIGS. 1 through 4, FIG. 5 comprises the steps of: (100) determining formation 16 characteristics, such as, but not limited to, strength of the matrix, permeability, formation pressure, and overburden pressure; (102) selecting a pressure transient profile for the evaluated formation 16 that facilitates obtaining perforation tunnels 20 that promote fluid communication between wellbore 12 and formation 16; (104) selecting a perforating tool 22 profile for creating the desired tunnels 20 in formation 16; (106) selecting a wellbore fluid 28 to achieve the dynamic transient pressure profile desired, considering the explosive force of charges 24 and volume of gun 22; and (108) performing a perforation operation utilizing the selected perforating gun 22 and wellbore fluid 28.

From the foregoing detailed description of specific embodiments of the invention, it should be apparent that a system for controlling the dynamic pressure transient during a perforating operation that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of controlling a dynamic pressure transient during a perforation operation comprising the steps of:
   determining the characteristics of a formation to be perforated;
   selecting a dynamic pressure transient profile based on the formation characteristics that facilitates creating fluid communication between a wellbore and the formation;
   selecting a perforating tool having characteristics to achieve the desired fluid communication between the wellbore and the formation;
   selecting a wellbore fluid based on the formation characteristics and selected perforating tool characteristics to substantially acquire the selected dynamic pressure transient profile selected; and
   performing a perforation operation based on the selected perforating tool and wellbore fluid.

2. The method of claim 1, wherein the selected wellbore fluid is a substantially incompressible fluid.

3. The method of claim 1, wherein the selected wellbore fluid is a compressible fluid.

4. The method of claim 1, wherein the selected wellbore fluid is a foam.

5. The method of claim 1, wherein the selected wellbore fluid is water.

6. The method of claim 1, wherein the selected wellbore fluid is a brine.

7. The method of claim 1, wherein the selected wellbore fluid further includes a reactive agent.

8. The method of claim 1, wherein the selected wellbore fluid further includes a viscosifier.

9. The method of claim 1, wherein the selected wellbore fluid includes a surfactant.

10. The method of claim 1, wherein the selected dynamic pressure transient is underbalanced.

11. The method of claim 1, wherein the selected dynamic pressure transient is overbalanced.

12. The method of claim 2, wherein the selected wellbore fluid further includes a reactive agent.

13. The method of claim 2, wherein the selected wellbore fluid further includes a viscosifier.

14. The method of claim 2, wherein the selected wellbore fluid includes a surfactant.

15. The method of claim 3, wherein the selected wellbore fluid further includes a reactive agent.

16. The method of claim 3, wherein the selected wellbore fluid further includes a viscosifier.

17. The method of claim 3, wherein the selected wellbore fluid includes a surfactant.

18. A method of controlling a dynamic pressure transient during a perforation operation comprising the steps of:
   filling at least a portion of the wellbore with a wellbore fluid selected for controlling a dynamic pressure transient upon and after detonation of the perforating tool; and
   perforating a wellbore by detonating a perforating tool.

19. The method of claim 18, wherein the selected wellbore fluid is a substantially incompressible fluid.

20. The method of claim 18, wherein the selected wellbore fluid is a compressible fluid.

* * * * *